US009341286B1

(12) United States Patent
Oh

(10) Patent No.: US 9,341,286 B1
(45) Date of Patent: May 17, 2016

(54) SPRINKLER REDUCER FIXING BRACKET

(71) Applicant: Kofulso Co., Ltd., Incheon-si (KR)

(72) Inventor: Seung-il Oh, Seoul (KR)

(73) Assignee: KOFULSO CO., LTD., Incheon-Si (KR)

( * ) Notice: Subject to any disclaimer, the term of this patent is extended or adjusted under 35 U.S.C. 154(b) by 0 days.

(21) Appl. No.: 14/608,698

(22) Filed: Jan. 29, 2015

(51) Int. Cl.

| | |
|---|---|
| ***A62C 13/76*** | (2006.01) |
| ***F16L 3/10*** | (2006.01) |
| ***F16M 13/02*** | (2006.01) |
| ***A62C 35/00*** | (2006.01) |

(52) U.S. Cl.
CPC . *F16L 3/10* (2013.01); *A62C 35/00* (2013.01); *F16M 13/027* (2013.01)

(58) Field of Classification Search
CPC .......... F16L 3/10; F16M 13/027; A62C 35/00
See application file for complete search history.

(56) References Cited

U.S. PATENT DOCUMENTS

| | | | | |
|---|---|---|---|---|
| 2,375,513 | A | 5/1945 | Bach | |
| 3,341,909 | A | 9/1967 | Havener | |
| 3,556,452 | A | 1/1971 | Ramsey | |
| 3,558,091 | A | 1/1971 | Bush | |
| 3,608,857 | A | 9/1971 | Hibbeler | |
| 3,612,461 | A | 10/1971 | Brown | |
| 3,652,780 | A | 3/1972 | Wilson | |
| 3,874,035 | A | 4/1975 | Schuplin | |
| 4,135,692 | A | 1/1979 | Ferguson | |
| 4,149,693 | A | 4/1979 | LoNigro | |
| 4,408,428 | A | 10/1983 | Brooke et al. | |
| 4,544,119 | A | 10/1985 | Kellett et al. | |
| 4,717,099 | A | 1/1988 | Hubbard | |
| 4,723,749 | A | 2/1988 | Carraro et al. | |
| 5,595,363 | A | 1/1997 | DeLeeBeeck | |
| 5,667,181 | A | 9/1997 | van Leeuwen et al. | |
| 6,260,810 | B1 | 7/2001 | Choi | |
| 6,341,466 | B1 | 1/2002 | Kehoe et al. | |
| 6,345,800 | B1 | 2/2002 | Herst et al. | |
| 6,554,231 | B2 | 4/2003 | Choi | |
| 6,811,130 | B1 | 11/2004 | Oh | |
| 7,032,690 | B2 | 4/2006 | Ramey et al. | |
| 7,255,315 | B2 | 8/2007 | Oh | |
| 8,833,719 | B2 * | 9/2014 | Lim .......................... | F16L 3/02 248/226.11 |
| 9,004,422 | B2 * | 4/2015 | Feenstra ................... | F16L 3/02 248/200.1 |
| 2008/0099640 | A1 * | 5/2008 | Kafenshtok ............. | E04B 9/001 248/200.1 |
| 2011/0260012 | A1 * | 10/2011 | Oh ......................... | A62C 35/68 348/89 |

* cited by examiner

*Primary Examiner* — Amy Sterling
(74) *Attorney, Agent, or Firm* — Jacobson Holman, PLLC.

(57) ABSTRACT

The present invention relates to a sprinkler reducer fixing bracket including: a body having an insertion space portion fitted to a horizontal bar, a first mounting portion to which a reducer is fitted, first shaft holes formed on one side of the first mounting portion, a through hole formed at the center of a wall portion defining the insertion space portion, protruding portions protruding backwardly from the top and underside of the through hole, and long holes formed on the protruding portions; a locking pin having a shape of 'U' fitted to the long holes; a hook having a second mounting portion to which the reducer is fitted, second shaft holes formed on one side of the second mounting portion, and a plurality of inclined teeth formed at a position pushing one side of the locking pin on the rear side thereof when turned around a shaft member and becomes at a closed position; and the shaft member coupled to the first shaft hole and the second shaft hole.

3 Claims, 4 Drawing Sheets

SPRINKLER REDUCER FIXING BRACKET

BACKGROUND OF THE INVENTION

1. Field of the Invention

The present invention relates to a sprinkler reducer fixing bracket, and more particularly, to a sprinkler reducer fixing bracket that is capable of just pushing a sprinkler reducer thereinto, thus conveniently installing the sprinkler reducer thereon.

2. Background of the Related Art

Generally, a sprinkler reducer fixing bracket is used as means for installing a sprinkler reducer on a horizontal bar disposed on a ceiling. The sprinkler reducer is connected to a flexible hose on one side thereof and to a sprinkler head on the other side thereof.

A conventional sprinkler reducer fixing bracket includes a body fitted to a horizontal bar through an open portion thereof, means for inserting a sprinkler reducer into the body to allow the reducer to erect vertically and closing the open portion of the body, and locking means for maintaining the closed state of the open portion of the body.

According to the conventional sprinkler reducer fixing bracket, by the way, the means for inserting the reducer into the body to allow the reducer to erect vertically and closing the open portion of the body and the locking means for maintaining the closed state of the open portion of the body should be operated sequentially by a worker standing on a stand and looking up toward the ceiling, thus undesirably making it hard to install the sprinkler reducer on the horizontal bar.

Accordingly, this inventor has studied on a sprinkler reducer fixing bracket capable of just pushing a sprinkler reducer into a body to automatically close an open portion of the body, and as a result, the sprinkler reducer fixing bracket has been developed and proposed.

SUMMARY OF THE INVENTION

Accordingly, the present invention has been made in view of the above-mentioned problems occurring in the prior art, and it is an object of the present invention to provide a sprinkler reducer fixing bracket that is capable of just pushing a sprinkler reducer thereinto, thus conveniently installing the sprinkler reducer thereon.

To accomplish the above-mentioned object, according to the present invention, there is provided a sprinkler reducer fixing bracket including: a body having an insertion space portion fitted to a horizontal bar, a first mounting portion to which a reducer is fitted, first shaft holes formed on one side of the first mounting portion, a through hole formed at the center of a wall portion defining the insertion space portion, protruding portions protruding backwardly from the top and underside of the through hole, and long holes formed on the protruding portions; a locking pin having a shape of 'U' fitted to the long holes; a hook having a second mounting portion to which the reducer is fitted, second shaft holes formed on one side of the second mounting portion, and a plurality of inclined teeth formed at a position pushing one side of the locking pin on the rear side thereof when turned around a shaft member and becomes at a closed position; and the shaft member coupled to the first shaft hole and the second shaft hole.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, an explanation on a sprinkler reducer fixing bracket according to the present invention will be in detail given with reference to the attached drawing.

Figure 1:
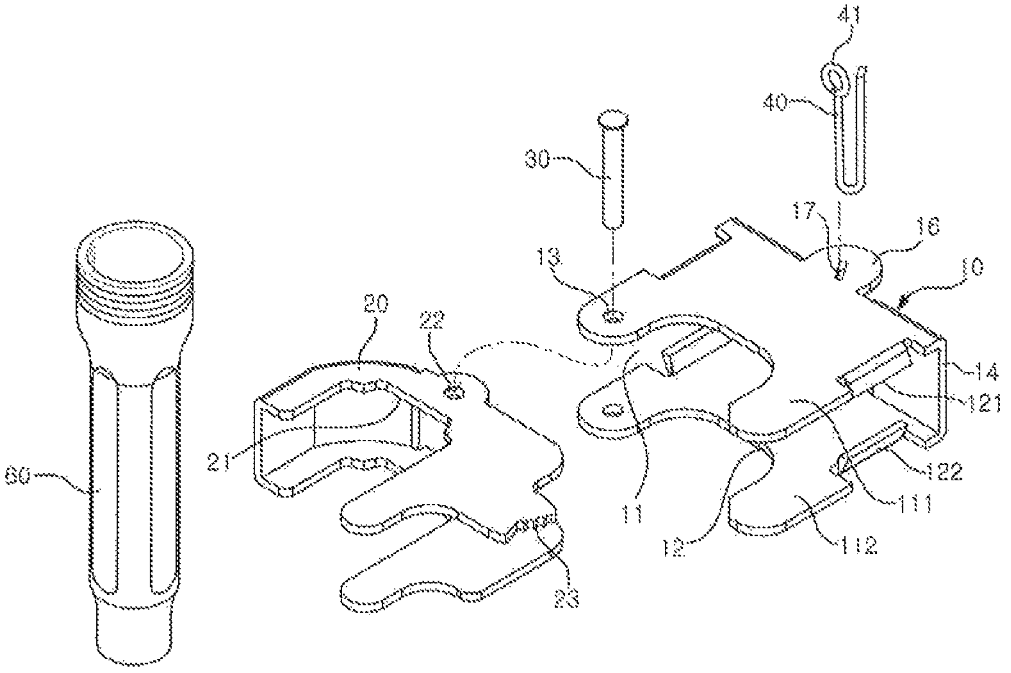
FIG. 1 is an exploded perspective view showing a sprinkler reducer fixing bracket according to the present invention.

As shown in FIG. 1, a sprinkler reducer fixing bracket according to the present invention includes: a body 10 fitted to a horizontal bar 50; a hook 20 rotatably coupled to the body 10 by means of a shaft member 30; and a locking pin 40 as locking means adapted to fix a closed position of the hook 20.

The body 10 has an insertion space portion 11 fitted to the horizontal bar 50 and a first mounting portion 12 to which a reducer 60 is fitted to erect vertically.

The body 10 further has first shaft holes 13 formed on one side of the first mounting portion 12, a through hole 15 formed at the center of a wall portion 14 defining the insertion space portion 11, protruding portions 16 protruding backwardly from the top and underside of the through hole 15, and long holes 17 formed on the protruding portions 16. Further, the body 10 has inclined portions 121 and 122 inclined inwardly from both sides of horizontal portions 111 and 112 defining the insertion space portion 11. The inclined portions 121 are coupled to the horizontal bar 50 in such a manner as to be brought into contact with the top surface of the horizontal bar 50, and the inclined portions 122 are fitted to a slot 51 of the horizontal bar 50.

Figure 4:
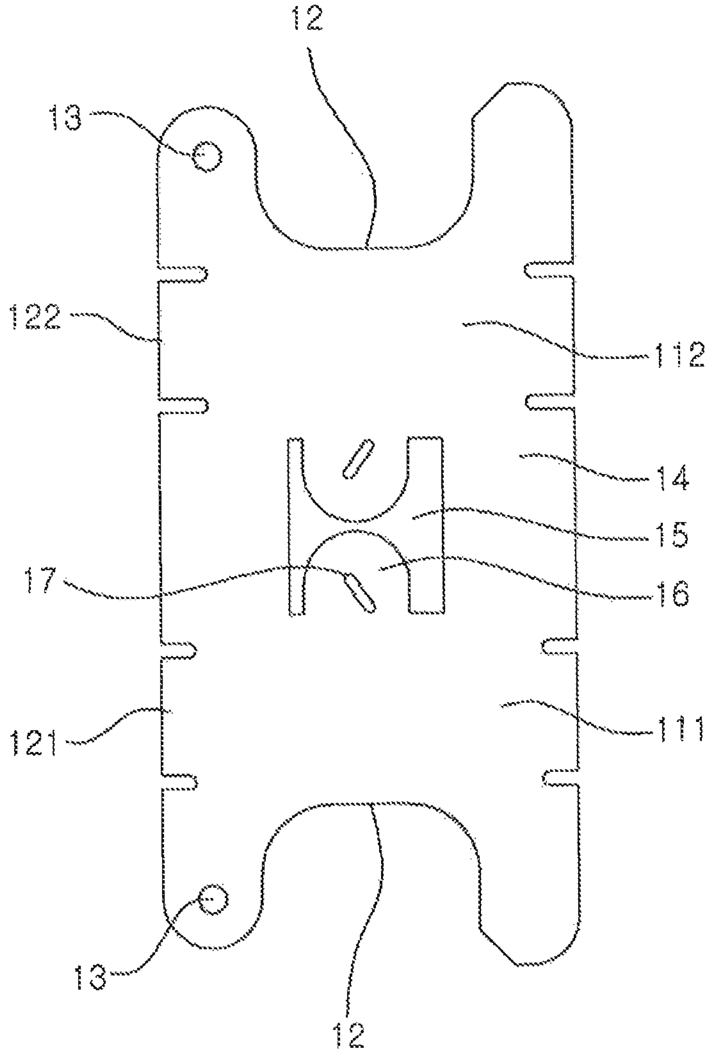
FIG. 4 is a developed view showing a body of the sprinkler reducer fixing bracket according to the present invention.

The body 10 is made by folding a sheet as shown in FIG. 4 to a shape of 'u'. As a result, the first mounting portion 12 and the first shaft holes 13 are formed on the upper and lower horizontal portions 111 and 112, and the insertion space portion 11 is formed between the upper and lower horizontal portions 111 and 112. The protruding portions 16 are portions remaining after the center portion of the wall portion 14 is incised to form the through hole 15. The through hole 15 is a space connected to the insertion space portion 11.

Figure 2:
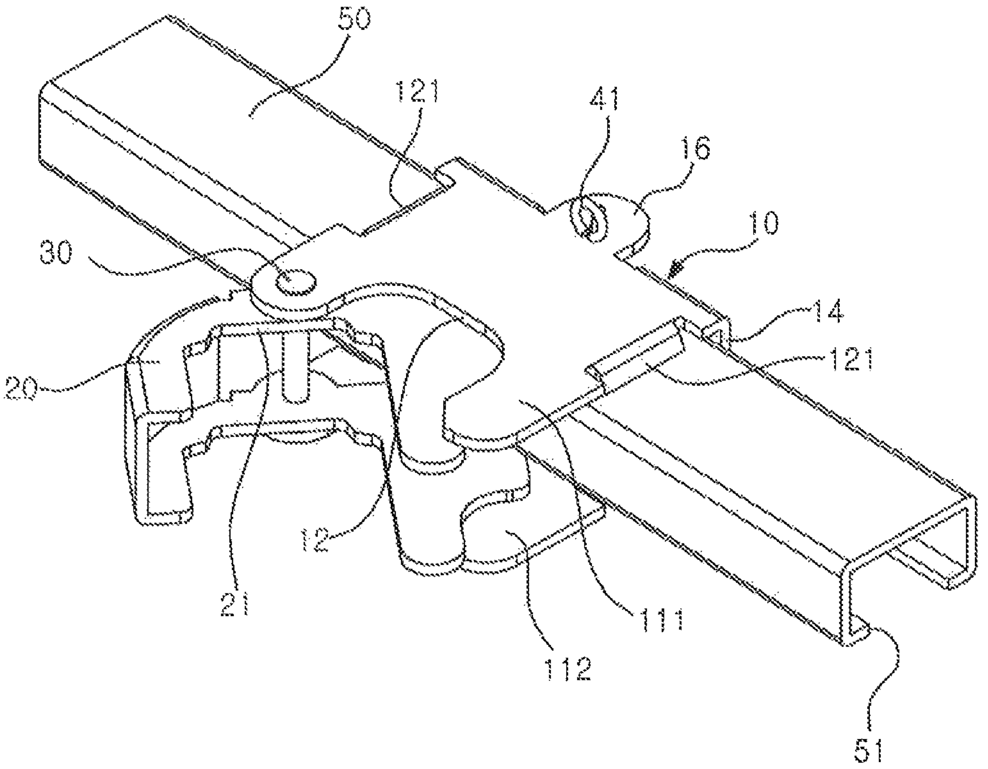
FIG. 2 is a perspective view showing the coupled state of the sprinkler reducer fixing bracket according to the present invention wherein a hook is at an open state.
Figure 3:
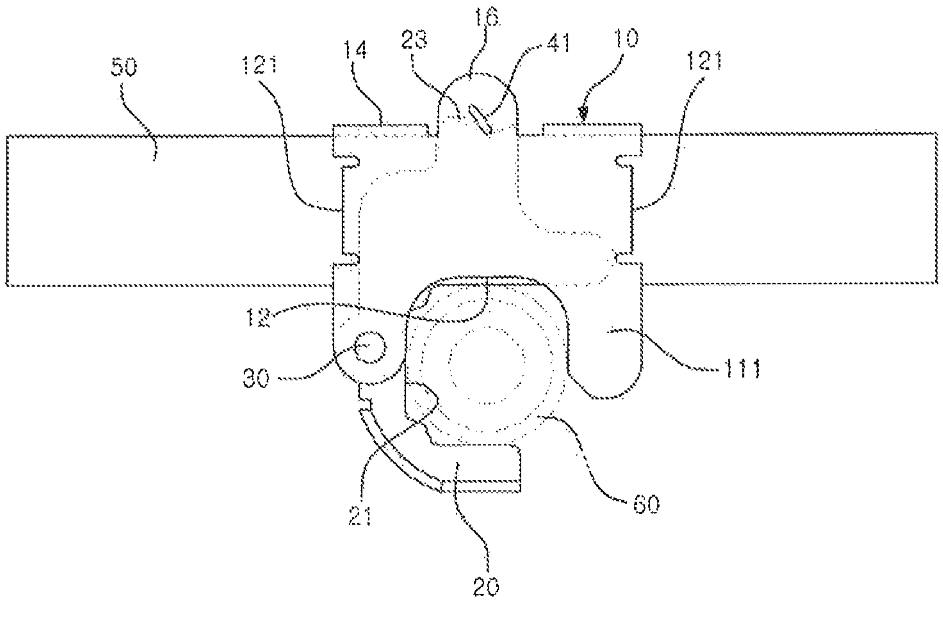
FIG. 3 is a plan view showing the coupled state of the sprinkler reducer fixing bracket according to the present invention wherein the hook is at a closed state.

The hook 20 has a second mounting portion 21 to which the reducer 60 is fitted, second shaft holes 22 formed on one side of the second mounting portion 21, and a shaft member 30 coupled to the first and second shaft holes 13 and 22. That is, the hook 20 is rotatably coupled to the body 10 around the shaft member 30. The second mounting portion 21 whose open portion is open at an opening position, as shown in FIG. 2, thus allowing the reducer 60 to be fitted thereto, and the second mounting portion 21 serves to hold the reducer 60 together with the first mounting portion 13, at a closing position, as shown in FIG. 3.

The locking pin 40 has a shape of 'U' fitted to the long holes 17 and a loop portion 41 formed on the upper portion of one side thereof in such a manner as to be protruded upwardly from the upper protruding portion 16.

The hook 20 has a plurality of inclined teeth 23 formed at a position pushing one side of the locking pin 40 on the rear side thereof. The inclined teeth 23 serve as locking means which pushes one side of the locking pin 40 when the hook 20 is turned around the shaft member 30 to allow the locking pin 40 to be locked thereonto at the closed position of the hook 20, thus fixing the hook 20 thereto. At this time, one side of the locking pin 40 is supported against the long hole 17, and the other side thereof pushes when the inclined teeth 23 are passed and is then locked by the inclined teeth 23 by means of an elastic force thereof.

So as to locate the reducer 60 on the bracket according to the present invention, like this, the horizontal bar 50 disposed on a ceiling is first fitted to the insertion space portion 11 of the body 10. As shown in FIG. 2, the open portion of the second mounting portion 21 of the hook 20 is deviated from the body 10. In this state, the inclined portions 121 inclined inwardly from the horizontal portion 111 provide the space in which the hook 20 is turned toward the interior of the insertion space portion 11 along the top surface of the horizontal bar 50, and the inclined portions 122 inclined inwardly from the horizontal portion 112 are fitted to the slot 51 of the horizontal bar 50 to allow the body 10 to be moved horizontally, while preventing the body 10 from being moved forwardly and backwardly.

If the reducer 60 erecting vertically is inserted into the second mounting portion 21 and pushes toward the horizontal bar 50, the hook 20 is turned around the shaft member 30 coupled to the first and second shaft holes 13 and 22, so that a portion of the open portion of the second mounting portion 21 is laid on the underside of the body 10 and at the same time the inclined teeth 23 are moved at the state of pushing one side of the locking pin 40. As shown in FIG. 3, if the hook 20 is completely turned to the closed state, the reducer 60 is coupled in the state of being engaged with the first mounting portion 12 and the second mounting portion 21, and at this time, the locking pin 40 is locked onto the final inclined tooth 23, thus completing the installation of the reducer 60.

On the other hand, the locking pin 40 protruding upwardly from the protruding portion 16 pushes toward one side to release the locking state onto the inclined teeth 23, and next, the reducer 60 pushes to turn the hook 20 to the open position, thus conveniently disassembling the reducer 60 from the bracket.

As described above, if the reducer 60 pushes toward the first mounting portion 12 in the state of being inserted into the second mounting portion 21, the hook 20 is turned around the shaft member 30 and becomes at the closed position, so that the locking pin 40 is locked onto the inclined teeth 23 to fix the closed state of the hook 20, thus conveniently installing the reducer 60 on the bracket.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A sprinkler reducer fixing bracket comprising:

a body having an insertion space portion fitted to a horizontal bar, a first mounting portion to which a reducer is fitted, first shaft holes formed on one side of the first mounting portion, a through hole formed at the center of a wall portion defining the insertion space portion, protruding portions protruding backwardly from the top and underside of the through hole, and long holes formed on the protruding portions;

a locking pin having a shape of 'U' fitted to the long holes;

a hook having a second mounting portion to which the reducer is fitted, second shaft holes formed on one side of the second mounting portion, and a plurality of inclined teeth formed at a position pushing one side of the locking pin on the rear side thereof when turned around a shaft member and becomes at a closed position; and the shaft member coupled to the first shaft hole and the second shaft hole.

2. The sprinkler reducer fixing bracket according to claim 1, wherein the body further has inclined portions and inclined inwardly from both sides of horizontal portions and defining the insertion space portion.

3. The sprinkler reducer fixing bracket according to claim 1, wherein the locking pin has a loop portion formed on the upper portion of one side thereof.

* * * * *